US011503669B2

(12) United States Patent
Asakura et al.

(10) Patent No.: US 11,503,669 B2
(45) Date of Patent: Nov. 15, 2022

(54) NON-TRANSITORY COMPUTER-READABLE STORAGE MEDIUM FOR RECEIVING DEVICE IDENTIFYING INFORMATION AND SELECTING A TARGET DEVICE FROM AT LEAST ONE FUNCTION EXECUTING DEVICE

(71) Applicant: BROTHER KOGYO KABUSHIKI KAISHA, Nagoya (JP)

(72) Inventors: Hirotaka Asakura, Nagoya (JP); Longlong Ruan, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 58 days.

(21) Appl. No.: 17/106,723

(22) Filed: Nov. 30, 2020

(65) Prior Publication Data

US 2021/0084715 A1    Mar. 18, 2021

Related U.S. Application Data

(63) Continuation of application No. 15/916,677, filed on Mar. 9, 2018, now Pat. No. 10,856,363.

(30) Foreign Application Priority Data

Mar. 10, 2017    (JP) .............................. JP2017-046671

(51) Int. Cl.
*H04W 92/18*    (2009.01)
*G06F 3/12*    (2006.01)
(Continued)

(52) U.S. Cl.
CPC .......... *H04W 92/18* (2013.01); *G06F 3/1204* (2013.01); *G06F 3/1236* (2013.01);
(Continued)

(58) Field of Classification Search
CPC ......... H04W 92/18; H04W 4/70; H04W 4/80; H04W 8/005; H04W 8/24; H04W 76/14; H04W 88/02; H04W 88/06; G06F 3/1236
See application file for complete search history.

(56) References Cited

U.S. PATENT DOCUMENTS

2008/0007403 A1 * 1/2008 Lai .................... G08B 17/10
                                                              340/541
2008/0297835 A1   12/2008 Toda
(Continued)

FOREIGN PATENT DOCUMENTS

CN    105322986 A    2/2016
CN    105744466 A    7/2016
(Continued)

OTHER PUBLICATIONS

Office Action issued in corresponding Chinese Patent Application No. 201810195769.1, dated Apr. 6, 2021.
(Continued)

*Primary Examiner* — Ayanah S George
(74) *Attorney, Agent, or Firm* — Merchant & Gould P.C.

(57) ABSTRACT

A terminal performs: in response to receipt of first identifying information, from a first function-executing device via a first wireless connection established between the terminal and the first function-executing device, receiving, when the computer program is launched by an OS program of the terminal, at least the first device-identifying information from the OS program; establishing a second wireless connection between the terminal and the first function-executing device, using the first device-identifying information received from the OS program without requiring user input of an operation for selecting a connection-target function-executing device from at least one function-executing device; receiving first function information that indicates at least one function executable by the first function-executing (Continued)

device; and displaying, a first function screen for enabling a user to select a function required of the first function-executing device to execute, from the at least one function executable by the first function-executing device.

19 Claims, 8 Drawing Sheets

(51) Int. Cl.
  *H04W 4/70* (2018.01)
  *H04W 4/80* (2018.01)
  *H04W 8/00* (2009.01)
  *H04W 8/24* (2009.01)
  *H04W 76/14* (2018.01)
  *H04W 88/02* (2009.01)
  *H04W 88/06* (2009.01)

(52) U.S. Cl.
  CPC .......... *G06F 3/1238* (2013.01); *G06F 3/1273* (2013.01); *G06F 3/1292* (2013.01); *H04W 4/70* (2018.02); *H04W 4/80* (2018.02); *H04W 8/005* (2013.01); *H04W 8/24* (2013.01); *H04W 76/14* (2018.02); *H04W 88/02* (2013.01); *H04W 88/06* (2013.01)

(56) References Cited

U.S. PATENT DOCUMENTS

| | | | |
|---|---|---|---|
| 2012/0191254 A1* | 7/2012 | Cho | ................ F24F 11/30 |
| | | | 700/276 |
| 2015/0350905 A1 | 12/2015 | Suzuki | |
| 2016/0034237 A1 | 2/2016 | Kojima et al. | |

FOREIGN PATENT DOCUMENTS

| | | |
|---|---|---|
| CN | 205750830 U | 11/2016 |
| JP | 2008-290426 A | 12/2008 |
| JP | 2014-228944 A | 12/2014 |
| JP | 2015-210784 A | 11/2015 |
| JP | 2015-228111 A | 12/2015 |
| JP | 2016-31668 A | 3/2016 |
| JP | 2017-4048 A | 1/2017 |
| JP | 2017-27100 A | 2/2017 |

OTHER PUBLICATIONS

Wi-Fi Alliance Technical Committee PSP Task Group, "Wi-Fi Peer-to Peer (P2P) Technical Specification", Version 1.1, 159 pages, 2010.

Office Action issued in corresponding Chinese Patent Application No. 201810195769.1, dated Aug. 19, 2020.

Office Action (Notice of Reasons for Refusal) issued in corresponding Japanese Patent Application No. 2017-046671, dated Sep. 15, 2020.

* cited by examiner

Fig.4 (CONTINUATION OF Fig. 3)

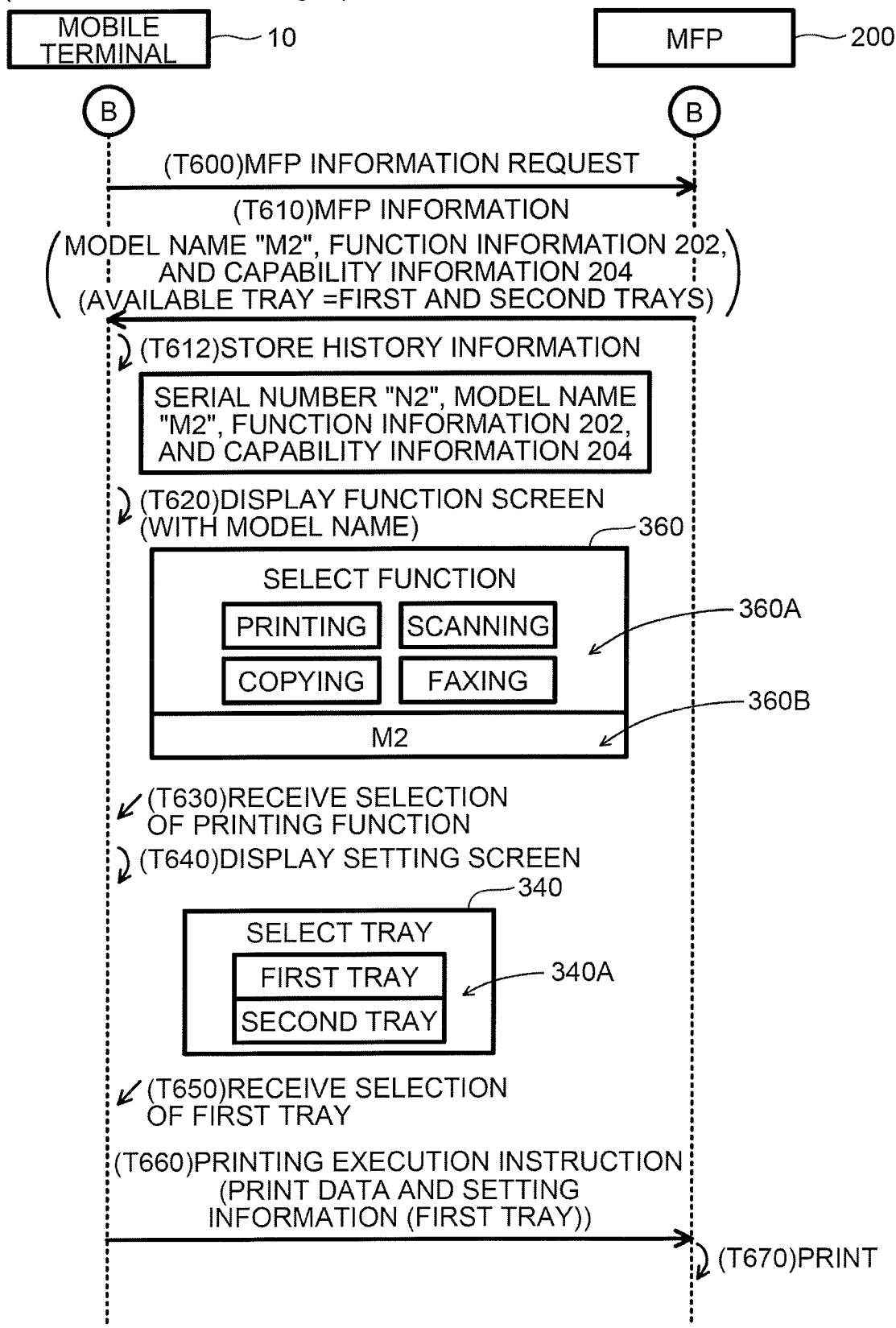

NON-TRANSITORY COMPUTER-READABLE STORAGE MEDIUM FOR RECEIVING DEVICE IDENTIFYING INFORMATION AND SELECTING A TARGET DEVICE FROM AT LEAST ONE FUNCTION EXECUTING DEVICE

CROSS-REFERENCE TO RELATED APPLICATION

This application is a continuation of U.S. patent application Ser. No. 15/916,677, filed Mar. 9, 2018, which claims priority from Japanese Patent Application No. 2017-046671 filed on Mar. 10, 2017. The content of the aforementioned applications are incorporated herein by reference in their entirety.

FIELD OF DISCLOSURE

Aspects disclosed herein relate to a terminal capable of displaying a function screen for enabling a user to select a function required of a function executing device to execute.

BACKGROUND

Some known communication system includes a mobile terminal and a plurality of multifunction devices. In response to execution of an operation for launching an output program, the mobile terminal executes necessary processing in accordance with the output program. That is, in response to receipt of instruction for executing a searching operation, the mobile terminal searches one or more multifunction devices with which the mobile terminal is capable of communicating, and displays one or more multifunction devices found by the search, on a device selecting screen that enables a user to select a desired multifunction device. Subsequently, in response to input of user selection of a desired multifunction device, the mobile terminal communicates with the multifunction device selected on the device selecting screen to receive device information on the selected multifunction device. Thus, the mobile terminal displays a main screen for enabling the user to select an operation required of the multifunction device to perform, based on the device information.

SUMMARY

Nevertheless, in the known technique, the user may need to perform multiple operations including the output program launching operation, the searching operation, and the selecting operation on the device selecting screen, in order for the mobile terminal to display the main screen for enabling the user to select an operation required of the multifunction device to perform. Accordingly, some embodiments of the disclosure provide for a technique of improving user friendliness in displaying a function screen on a terminal.

According to the one or more aspects of the disclosure, a non-transitory computer-readable storage medium storing a computer program for causing a computer of a terminal to perform: receiving first device-identifying information from an operating system ("OS") program of the terminal, wherein the first device-identifying information identifies a first function-executing device and is included in first identifying information received at the terminal, the first identifying information being received at the terminal from the first function executing device via a first wireless connection established between the terminal and the first function executing device via a first wireless interface of the terminal; receiving first function information that indicates at least one function executable by the first function-executing device, from the first function-executing device via a second wireless connection between a second wireless interface of the terminal and the first function-executing device, wherein the second wireless connection is established without requiring user input of an operation for selecting a connection-target function-executing device from at least one function-executing device, and wherein a maximum communicable speed of wireless communication via the second wireless interface is faster than a maximum communicable speed of wireless communication via the first wireless interface; and displaying, on a display of the terminal, at least one user-selectable function included in a first function screen, the at least one user-selectable function selected for display based on the first function information and executable by the first function-executing device.

According to the one or more aspects of the disclosure, a terminal comprising: a first wireless interface; a second wireless interface that is different from the first wireless interface, wherein a maximum communicable speed of wireless communication via the second wireless interface is faster than a maximum communicable speed of wireless communication via the first wireless interface; a display; a memory; and a controller configured to execute instructions from the memory that, when executed, cause the terminal to perform: receiving first device-identifying information, wherein the first device-identifying information identifies a first function-executing device and is included in first identifying information received at the terminal, the first identifying information being received at the terminal from the first function executing device via a first wireless connection established between the terminal and the first function executing device via the first wireless interface; in response to receipt of the first device-identifying information, establishing a second wireless connection via the second wireless interface using the first device-identifying information without requiring user input of an operation for selecting a connection-target function-executing device from at least one function-executing device; and receiving first function information that indicates at least one function executable by the first function-executing device, from the first function-executing device via the second wireless connection between the second wireless interface of the terminal and the first function-executing device, displaying, on a display of the terminal, at least one user-selectable function included in a first function screen, the at least one user-selectable function selected for display based on the first function information and executable by the first function-executing device.

According to the one or more aspects of the disclosure, a method comprising: receiving first device-identifying information, wherein the first device-identifying information identifies a first function-executing device and is included in first identifying information received at a terminal, the first identifying information being received at the terminal from the first function executing device via a first wireless connection established between the terminal and the first function executing device via a first wireless interface of the terminal; in response to receipt of the first device-identifying information, establishing a second wireless connection via a second wireless interface of the terminal using the first device-identifying information without requiring user input of an operation for selecting a connection-target function-executing device from at least one function-executing device; and receiving first function information that indicates at least one function executable by the first function-executing device, from the first function-executing device via the second wireless connection between the second wireless interface of the terminal and the first function-executing device; and displaying, on a display of the terminal, at least one user-selectable function included in a first function screen, the at least one user-selectable function selected for display based on the first function information and executable by the first function-executing device; wherein a maximum communicable speed of wireless communication via the second wireless interface is shorter than a maximum communicable speed of wireless communication via the first wireless interface.

The terminal and methods executed by the terminal may have novelty and utility. Communication systems including the terminal and a function executing device may also have novelty and utility.

BRIEF DESCRIPTION OF THE DRAWINGS

Aspects of the disclosure are illustrated by way of example and not by limitation in the accompanying figures in which like reference characters indicate similar elements.

FIG. 8 is a continuation of the operation sequence diagram of FIG. 7 in the illustrative embodiment according to one or more aspects of the disclosure.

Figure 1:
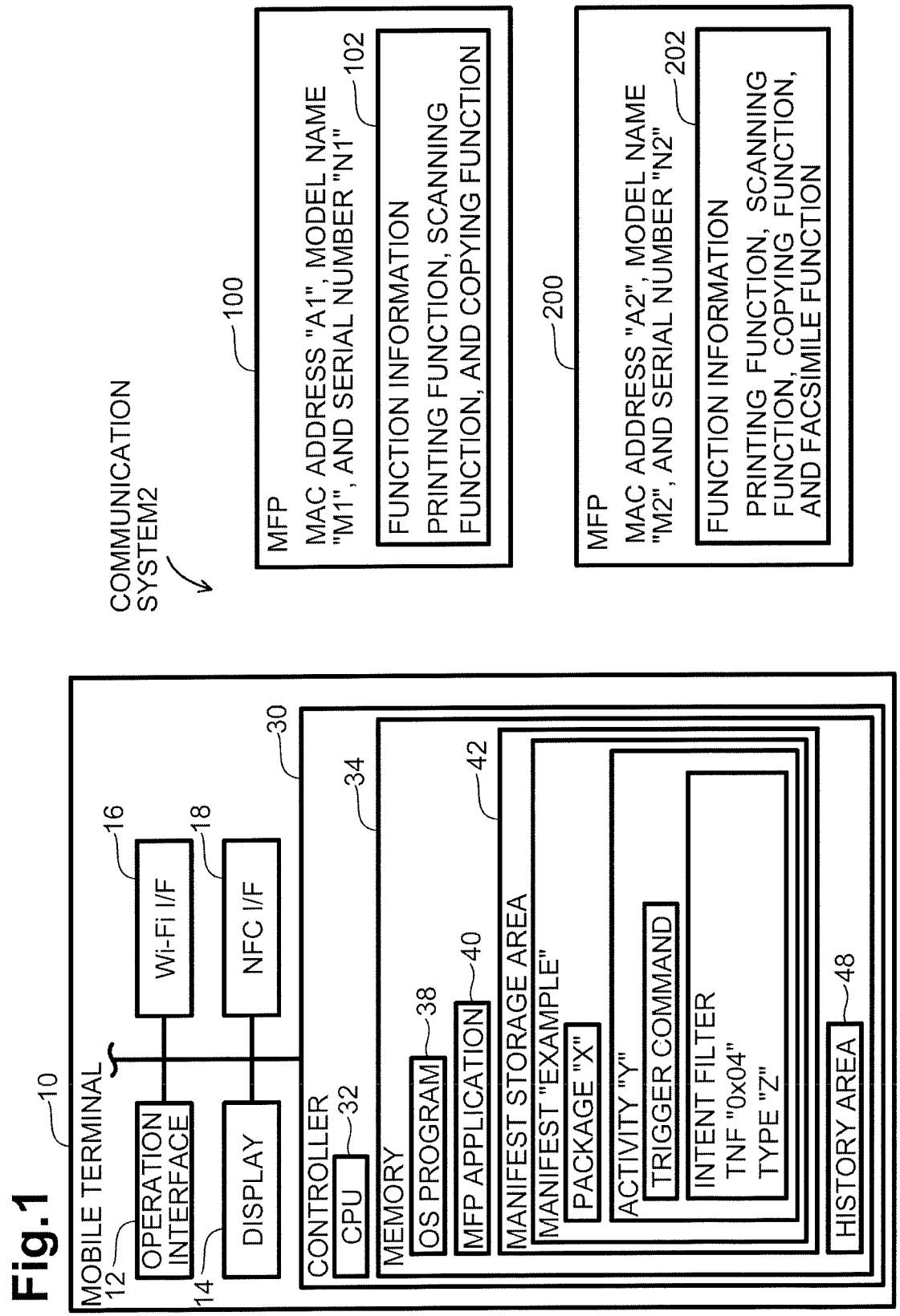
FIG. 1 illustrates a configuration of a communication system in an illustrative embodiment according to one or more aspects of the disclosure.

DETAILED DESCRIPTION (Configuration of Communication System 2: FIG. 1)

As illustrated in FIG. 1, a communication system 2 includes a mobile terminal 10 and a plurality of multifunction peripherals ("MFP") 100 and 200. Each of the mobile terminal 10 and the MFPs 100 and 200 is configured to selectively perform wireless communication in compliance with a Wi-Fi® (Wi-Fi® is a registered certification mark owned by the Wi-Fi Alliance of Austin, Tex.) system (hereinafter, referred to as a "WiFi® communication") and wireless communication in compliance with a Near Field Communication ("NFC") system (hereinafter, referred to as an "NFC communication").

(Configuration of Mobile Terminal 10)

The Mobile Terminal 10 may be a Portable Terminal, for Example, Mobile Phones, smartphones, personal digital assistants ("PDAs"), general-purpose laptops or general-purpose notebook computers, general-purpose tablet or mobile computers, mobile music players, or mobile movie players. The mobile terminal 10 includes an operation interface 12, a display 14, a Wi-Fi® interface ("I/F") 16, an NFC interface ("I/F") 18, and a controller 30, each of which is connected to a bus line (its reference numeral is not assigned).

The operation interface 12 includes a plurality of keys or buttons. The user is enabled to provide various instructions to the mobile terminal 10 by operating the operation interface 12. The display 14 is configured to display various information thereon. The display 14 also functions as a touch screen. That is, the display 14 also serves as an operation interface.

The Wi-Fi® I/F 16 is a wireless interface for enabling Wi-Fi® communication that complies with the WiFi® system. In the WiFi® system, wireless communication is performed in compliance with, for example, the standard IEEE (The Institute of Electrical and Electronics Engineers, Inc.) 802.11 and its family standards (e.g., 802.11a, 802.11b, 802.11g, and 802.11n). The Wi-Fi® I/F 16 supports a Wi-Fi Direct™ (Wi-Fi Direct™ is a certification mark owned by the Wi-Fi Alliance of Austin, Tex.) ("WFD") system developed by the Wi-Fi Alliance particularly, and enables wireless communication in compliance with the WFD system (hereinafter, referred to as "WFD communication". The WFD system is wireless communication specified in "Wi-Fi Peer-to-Peer (P2P) Technical Specification Version 1.1" created by the Wi-Fi Alliance.

The NFC I/F 18 enables NFC communication that complies with the NFC system. The NFC system is a wireless communication system in compliance with the International standard, e.g., ISO/IEC 14443, ISO/IEC 15693, or ISO/IEC 18092. In the illustrative embodiment, the NFC I/F 18 is configured to operate in a Reader mode of the NFC system to read (i.e., receive) data from an NFC I/F (not illustrated) of each of the MFPs 100 and 200 that each operates in a Card Emulation ("CE") mode of the NFC system. Nevertheless, in other embodiments, for example, the NFC I/F 18 may operate in a P2P mode of the NFC system or in the CE mode to receive data from the NFC I/F of each of the MFPs 100 and 200.

A communication method may be different between the NFC system and the WFD system. A communication speed in the WiFi® communication is faster than a communication speed in the NFC system. More specifically, for example, the maximum communication speed in the Wi-Fi® system may be between 11 and 600 Mbps and the maximum communication speed in the NFC communication may be between 100 and 424 Kbps. Further, Wi-Fi® communication uses a different carrier frequency from the NFC communication. More specifically, for example, WiFi® communication may use a 2.4 GHz band or a 5.0 GHz band and the NFC communication may use a 13.56 MHz band. The maximum communicable distance in WiFi® communication is greater than the maximum communicable distance in NFC communication. More specifically, for example, the maximum communicable distance in WiFi® communication may be approximately 100 m and maximum communicable distance in NFC communication may be approximately 10 m.

The controller 30 includes a central processing unit ("CPU") 32 and a memory 34. The CPU 32 is configured to execute various processing in accordance with an operating system ("OS") program 38 stored in the memory 34. The memory 34 may include a volatile memory and a nonvolatile memory. The OS program 38 is configured to implement ordinary operations of the mobile terminal 10. In the illustrative embodiment, the OS program 38 may be an Android™ (Android™ is a trademark owned by Google Inc. of Mountain View, Calif.) OS program. Nevertheless, in other embodiments, for example, the OS program 38 may be another program, e.g., iOS® (iOS® is a registered trademark owned by Cisco Technology, Inc. of San Jose, Calif.) program. The memory 34 is configured to also store an MFP application 40. The MFP application 40 is configured to cause each of the MFPs 100 and 200 to execute various functions. In one example, the MFP application 40 may be installed on the mobile terminal 10 from a server provided on the Internet by a vendor of the MFPs 100 and 200. In another example, the MFP application 40 may be installed on the mobile terminal 10 from a medium packed and shipped with each of the MFPs 100 and 200.

The memory 34 includes a manifest storage area 42 that may be an area for storing a manifest of an installed application. A manifest is a file provided for each application. When an application is downloaded and installed on the mobile terminal 10, its application manifest is also downloaded and stored into the manifest storage area 42. The manifest includes a package name that identifies the corresponding application, and one or more activities. The package name includes a domain name that is indicated by a text string including letters arranged from the left to the right, e.g., "com.example.android.beam". Each activity defines a screen to be displayed by the application, and more specifically, for example, defines launch conditions and actions for a screen.

When the MFP application 40 is installed on the mobile terminal 10, a manifest "EXAMPLE" of the MFP application 40 is stored into the manifest storage area 42. The manifest "EXAMPLE" includes a package name "X" that identifies the MFP application 40, and an activity "Y" for a launch screen (refer to step S10). The activity "Y" may be interpreted by the CPU 32. In response to the CPU 32 interpreting the activity "Y", the activity "Y" causes the CPU 32 to execute the following processing. That is, in a case where the mobile terminal 10 receives NFC Data Exchange Format ("NDEF") information from an external device and type information of the first record in the NDEF information includes a Type Name Format ("TNF") "0x04 (NFC Forum external type)" and a Type "Z", the CPU 32 launches the launch screen (refer to step S10) and provides the NDEF information to the MFP application 40. This situation may be implemented in a case where an intent-filter of the activity "Y" contains the following descriptions:
"<action android:name="android.nfc.action.NDEF DIS-COVERED"/>" and
"<data android:scheme="vnd.android.nfc"
android:host="ext"
android:pathPrefix="/Z"/>".

The memory 34 further includes a history area 48 that may be a storage area for history information relating to a usage history of an MFP (e.g., the MFP 100). The history information may be obtained by the MFP application 40 from the MFP. Therefore, until the MFP application 40 is launched for the first time, no history information is stored in the history area 48.

(Configuration of MFPs 100 and 200)

The MFP 100 is configured to execute multiple functions, e.g., a printing function, a scanning function, and a copying function. That is, the MFP 100 is a peripheral device for the mobile terminal 10. The MFP 100 includes a Wi-Fi® I/F (not illustrated) and a NFC I/F (not illustrated) and is configured to selectively perform WFD communication and NFC communication. The Wi-Fi® I/F of the MFP 100 is assigned with a Media Access Control ("MAC") address "A1". The MFP 100 is assigned with a model name "M1" and a serial number "N1" that identifies the MFP 100. The MFP 100 stores function information 102 indicating the printing function, the scanning function, and the copying function executable by the MFP 100.

The MFP 200 includes a similar configuration to the MFP 100. The MFP 200 is configured to execute a facsimile ("FAX") function in addition to the printing function, the scanning function, and the copying function. A Wi-Fi® I/F of the MFP 200 is assigned with a MAC address "A2", which differs from the MAC address "A1" of the MFP 100. The MFP 200 is assigned with a model name "M2", which also differs from the model name "M1" of the MFP 100. The MFP 200 is assigned with a serial number "N2", which also differs from the serial number "N1" of the MFP 100. The MFP 200 stores function information 202 indicating the printing function, the scanning function, the copying function, and the facsimile function executable by the MFP 200.

Each of the MFPs 100 and 200 is configured to, in response to a predetermined trigger event, become a Group Owner ("G/O") of the WFD system and operate in the G/O status. That is, each of MFPs 100 and 200 may configure a wireless network ("WFDNW") in which each of the MFPs 100 and 200 operates as a master station. The WFDNW configured by the MFP 100 is assigned with a different Service Set Identifier ("SSID") from the WFDNW configured by the MFP 200. An SSID is an identifier for a WFDNW. In other embodiments, for example, each of the MFPs 100 and 200 may operate as a SoftAP and configure a wireless network in which each of the MFPs 100 and 200 operates as a master station.

Figure 2:
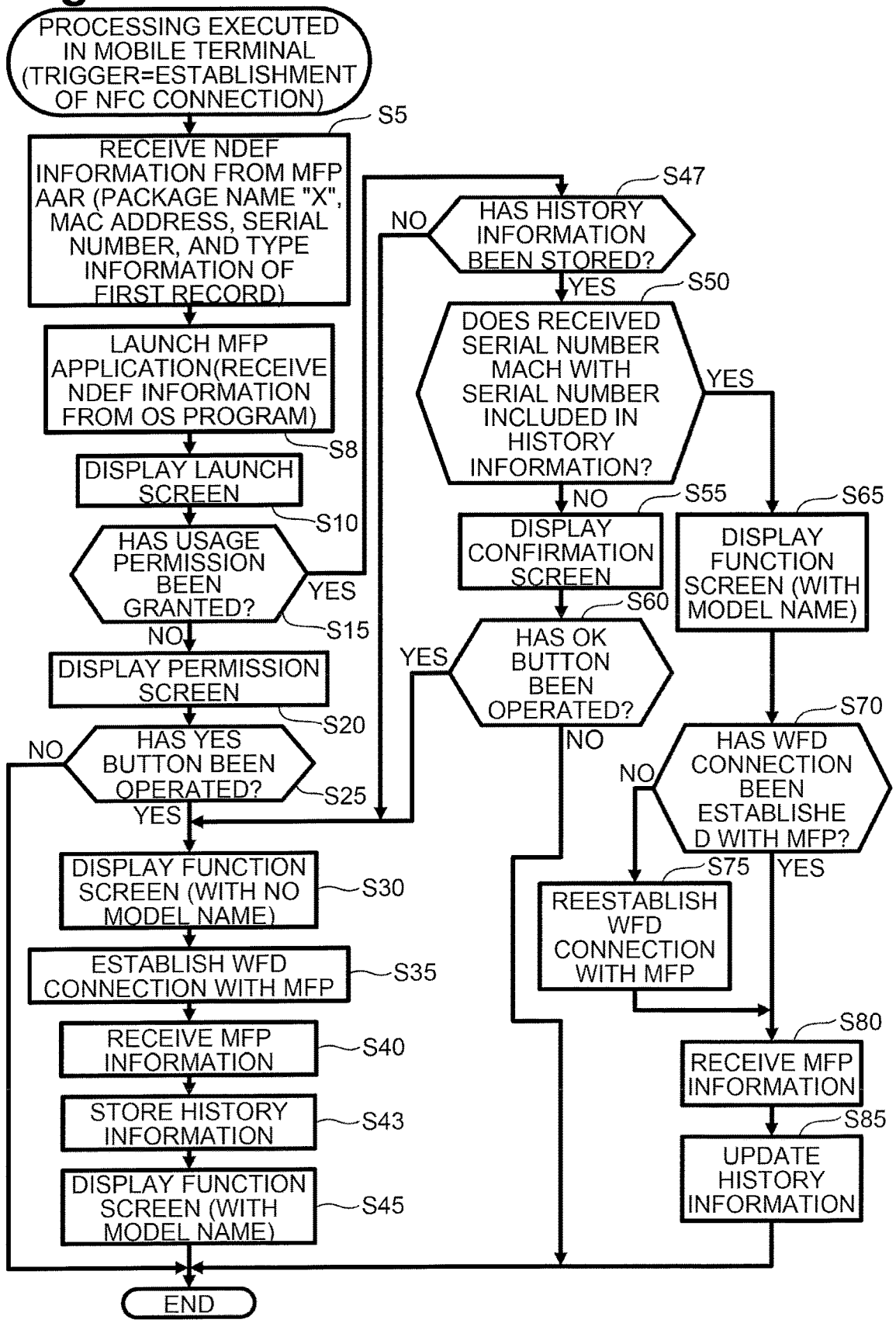
FIG. 2 is a flowchart of processing executed by a mobile terminal in the illustrative embodiment according to one or more aspects of the disclosure.

(Processing Executed in Mobile Terminal 10: FIG. 2)

Referring to FIG. 2, processing executed by the CPU 32 of the mobile terminal 10 will be described. The CPU 32 monitors establishment of a wireless connection between the mobile terminal 10 and an MFP (e.g., the MFP 100) via the NFC I/F 18 (hereinafter, such a connection is referred to as an "NFC connection"). In response to receipt of information indicating establishment of an NFC connection from the NFC I/F 18, the CPU 32 executes processing of FIG. 2. Hereinafter, an MFP that has established an NFC connection with the mobile terminal 10 is referred to as the "target MFP". At the time of starting the processing of FIG. 2, the MFP application 40 is not launched yet. Before the MFP application 40 is launched, each processing (e.g., steps S5 and S8) is implemented by the OS program 38. After the MFP application 40 is launched, each processing is implemented by a combination of the OS program 38 and the MFP application 40.

In step S5, the CPU 32 receives NDEF information from the target MFP via the NFC I/F 18. The NDEF information includes an Android Application Record ("AAR"), a MAC address of the target MFP, a serial number of the target MFP, and type information of the first record in the NDEF information. In the illustrative embodiment, the ARR includes the package name "X" of the MFP application 40. The type information of the first record in the NDEF information includes the TNF "0x04 (NFC Forum external type)" and the Type "Z".

In step S8, in response to recognition of receipt of the NDEF information including the type information of the first record in the NDEF information that includes the TNF "0x04 (NFC Forum external type)" and the Type "Z" and recognition that the received AAR includes the package name "X", the CPU 32 determines whether there is an activity which includes the package name "X" and is required to be executed in accordance with the type information including the TNF "0x04 (NFC Forum external type)" and the Type "Z". In the illustrative embodiment, the activity "Y" included in the manifest "EXAMPLE" applies. Therefore, the CPU 32 determines that the applicable activity is present by referring to the manifest storage area 42. In response to this, the CPU 32 launches the MFP application 40 identified by the package name "X". More specifically, for example, the CPU 32 provides a trigger command to the MFP application 40. The trigger command may be a command for instructing the MFP application 40 to display the launch screen (refer to step S10) corresponding to the activity "Y". Thus, the MFP application 40 executes processing of step S10 in response to the trigger command. Nevertheless, this trigger command does not instruct the MFP application 40 to display other screens (e.g., screens to be displayed in steps S20, S45, and S55) that are to be displayed subsequent to displaying of the launch screen. Each of the other screens is configured to be displayed subsequent to displaying of the launch screen in response to a respective command provided by the MFP application 40 but not in response to the trigger command. The CPU 32 provides (i.e., passes) the NDEP information received in step S5 to the MFP application 40 together with the trigger command. Nevertheless, in other embodiments, for example, the CPU 32 might not necessarily provide all pieces of information included in the NFED information. For example, in a case where only MAC address included in the NFED information is required in subsequent steps, only the MAC address may be provided to the MFP application 40. In the illustrative embodiment, it is assumed that, in the processing of FIG. 2, the MFP application 40 is not launched yet when an NFC connection is established between the target MFP and the mobile terminal 10. Nevertheless, it is also conceivable that, in some cases, the MFP application 40 may have already been launched when an NFC connection is established between the target MFP and the mobile terminal 10. In the latter case, the CPU 32 does not provide the trigger command to the MFP application 40 but provides the NDEF information to the MFP application 40. Further, the routine skips step S10 and the CPU 32 executes processing of step S15 and subsequent steps.

In step S10, the CPU 32 displays the launch screen on the display 14. The launch screen is a so-called splash screen and includes a vendor name of the target MFP. Displaying the launch screen on the display 14 may notify the user of launching of the MFP application 40.

In step S15, the CPU 32 determines whether permission for use of the MFP application 40 has been granted. More specifically, for example, the CPU 32 determines whether a permission flag is stored in the memory 34. The permission flag indicates that permission for use of the MFP application 40 has been granted. When the CPU 32 determines that the permission flag is stored in the memory 34, the CPU 32 determines that permission for use of the MFP application 40 has been granted (e.g., YES in step S15) and the routine proceeds to step S47. When the CPU 32 determines that the permission flag is not stored in the memory 34, the CPU 32 determines that permission for use of the MFP application 40 has not been granted (e.g., NO in step S15) and the routine proceeds to step S20.

In step S20, the CPU 32 displays a permission screen on the display 14. The permission screen may be displayed for asking the user whether use of the MFP application 40 is permitted. The permission screen includes a YES button that enables the user to grant permission for use of the MFP application 40.

In step S25, the CPU 32 determines whether an input indicating that the YES button has been operated has been received. When the YES button has been operated by the user, the CPU 32 makes a positive determination (e.g., YES) in step S25 and stores the permission flag in the memory 34. Then, the routine proceeds to step S30. When the YES button has not been operated by the user, i.e., when another button indicating that the use of the MFP application 40 is not permitted has been operated by the user, the CPU 32 makes a negative determination (e.g., NO) in step S25. Then, the routine of FIG. 2 ends without proceeding to step S30 and subsequent steps. Thus, in a case where permission for use of the MFP application 40 has not been granted by the user, i.e., if the user does not desire to use the MFP application 40, such a configuration may avoid execution of step S30 and subsequent steps in which the MFP application 40 is to be used.

In step S30, the CPU 32 displays a function screen on the display 14. This function screen may be a predetermined default screen and include text strings indicating predetermined two functions, e.g., the printing function and the scanning function, respectively. The default function screen does not include the model name of the target MFP. The default function screen does not allow the user to perform any operations thereon and may be a standby screen for having the user waiting until a function screen for the target MFP is displayed in step S45. Nevertheless, in other embodiments, for example, the processing of step S30 may be omitted. That is, subsequent to displaying of the launch screen of step S10, the function screen for the target MFP of step S45 may be displayed the next without displaying the default function screen of step S30.

In step S35, the CPU 32 establishes a wireless connection via the Wi-Fi® I/F 16 (hereinafter, referred to as the "WFD connection") between the mobile terminal 10 and the target MFP. More specifically, for example, the CPU 32 broadcasts a probe request for searching one or more master stations (e.g., G/O-status devices and/or access points) of wireless networks surrounding the mobile terminal 10. In response to this, the CPU 32 receives, from each of one or more master stations including the G/O-status target MFP, a probe response including a MAC address of the master station and an SSID of the wireless network configured by the master station. Subsequently, the CPU 32 identifies the probe response including the MAC address of the target MFP received in step S5, i.e., the probe response sent from the target MFP, among the one or more received probe responses. The CPU 32 then identifies the SSID included in the identified probe response, i.e., the SSID of the WFDNW configured by the target MFP (hereinafter, referred to as the "target WFDNW"). Thereafter, the CPU 32 unicasts a probe request including the identified SSID to the target MFP. The unicast probe request may be a command for requesting the target MFP to give permission for the mobile terminal 10 to join the target WFDNW configured by the target MFP. The CPU 32 receives a probe response from the target MFP in response to the unicast probe request and communicates various signals (e.g., Authentication signal, Association signal, WPS Exchange, and 4-way handshake) with the target MFP. During communication of the WPS Exchange, the CPU 32 receives a password to be used in the target WFDNW from the target MFP. During communication of the various signals, the CPU 32 transmits the password to the target MFP. In response to success of password authentication in the target MFP, the CPU 32 establishes a WFD connection between the mobile terminal 10 and the target MFP. Thus, the CPU 32 allows the mobile terminal 10 to join the target WFDNW as a slave station. In response to establishment of the WFD connection between the mobile terminal 10 and the target MFP, the CPU 32 stores the MAC address of the target MFP in a predetermined area of the memory 34. The predetermined area may be an area for storing a MAC address of a device with which the mobile terminal 10 currently establishes a WFD connection, i.e., the MAC address of the target MFP. Until the WFD connection between the mobile terminal 10 and the target MFP is broken, the CPU 32 holds the MAC address of the target MFP in the predetermined area of the memory 34.

For example, in a comparative case, it is assumed that the mobile terminal 10 does not receive the MAC address of the target MFP in step S5. In this case, since the mobile terminal 10 does not receive the MAC address of the target MFP, in step S35, the mobile terminal 10 cannot identify the probe response sent from the target MFP among the one or more probe responses received in response to the broadcast probe request. Therefore, the mobile terminal 10 may need to display the one or more SSIDs included in the respective one or more probe responses and prompt the user to select the SSID of the target WFDNW from the one or more SSIDs, i.e., prompt the user to perform an input operation for selecting the target MFP (hereinafter, referred to as the "device selecting operation"). As opposed to this, in the illustrative embodiment, the mobile terminal 10 receives the MAC address of the target MFP in step S5. Therefore, a WFD connection may be established between the mobile terminal 10 and the target MFP using the received MAC address without requiring the user's device selecting operation.

In step S40, the CPU 32 receives MFP information from the target MFP via the Wi-Fi® I/F 16 through the WFD connection established in step S35. More specifically, for example, the CPU 32 transmits an MFP information request to the target MFP. In response to this, the CPU 32 receives MFP information from the target MFP. The MFP information includes a model name of the target MFP, function information 102 indicating one or more functions executable by the target MFP (refer to FIG. 1), and capability information indicating capability of the target MFP relating to each function. Capability information on the printing function includes, for example, sheet tray availability (e.g., information indicating which tray is available), printing resolution availability (e.g., information indicating which resolution is available), printing color availability (e.g., information indicating which color printing, color and/or monochrome, is available), and duplex printing availability (e.g., information indicating whether duplex printing is available). Capability information on the scanning function includes, for example, document size availability (e.g., information indicating which size of documents is available for scanning), scanning resolution availability (e.g., information indicating which resolution is available), and scanning color availability (e.g., information indicating which color scanning, color and/or monochrome, is available). Capability information on the copying function includes, for example, sheet tray availability (e.g., information indicating which tray is available), and scanning color availability (e.g., information indicating which color copying, color and/or monochrome, is available).

In step S43, the CPU 32 stores history information in the history area 48 of the memory 43. The history information includes the serial number of the target MFP received in step S5 and the MFP information received in step S40.

In step S45, the CPU 32 displays a function screen for the target MFP on the display 14 using the MFP information received in step S40. The function screen for the target MFP includes text strings representing the functions identified by the function information included in the MFP information, and enables the user to select a function required of the target MFP to execute, from the identified functions. The function screen for the target MFP includes the model name of the target MFP included in the MFP information. This function screen for the target MFP may enable the user to confirm the target MFP by looking at the model name on the function screen and further to confirm the functions executable by the target MFP by looking the text strings representing the respective functions on the function screen. In response to completion of step S45, the processing of FIG. 2 ends.

As described above, in step S15, when the CPU 32 determines that permission for use of the MFP application 40 has been granted by the user (e.g., YES in step S15), the routine proceeds to step S47. In step S47, the CPU 32 determines whether history information is stored in the history area 48. When the CPU 32 determines that history information is already stored in the history area 48, the CPU 32 makes a positive determination (e.g., YES) in step S47 and the routine proceeds to step S50. When the CPU 32 determines that no history information is stored in the history area 48, the CPU 32 makes a negative determination (e.g., NO) in step S47 and executes the processing of steps S30 to S45. For example, in a case where establishment of the WFD connection is failed in step S35 although permission for use of the MFP application 40 was granted by the user (e.g., YES in step S25) in the processing of FIG. 2, the CPU 32 makes a negative determination (e.g., NO) in step S47 this time.

In step S50, the CPU 32 determines whether the serial number received in step S5 matches with the serial number included in the history information. That is, the CPU 32 determines whether the target MFP to be used this time (hereinafter, referred to as the "current target MFP") is the same as the target MFP used last time (hereinafter, referred to as the "last target MFP"). When the CPU 32 determines that the serial number received in step S5 matches with the serial number included in the history information, the CPU 32 makes a positive determination (e.g., YES) in step S50 and the routine proceeds to step S65. When the CPU 32 determines that the serial number received in step S5 does not match with the serial number included in the history information, the CPU 32 makes a negative determination (e.g., NO) in step S50 and the routine proceeds to step S55.

In step S55, the CPU 32 displays a confirmation screen including an OK button on the display 14. The confirmation screen may be displayed for asking the user whether a WFD connection needs to be established with the current target MFP that is different from the last target MFP. Such a confirmation screen may therefore enable the user to notify that the current target MFP is different from the last target MFP.

In step S60, the CPU 32 determines whether an input indicating that the OK button included in the confirmation screen has been operated. When the OK button has been operated by the user, the CPU 32 makes a positive determination (e.g., YES) in step S60 and executes the processing of steps S30 to S45. In this case, in step S43, the CPU 32 erases the history information relating to the last target MFP from the history area 48 and stores the history information relating to the current target MFP in the history area 48. When the OK button has not been operated, i.e., when another button indicating that a WFD connection does not need to be established with the current target MFP, the CPU 32 makes a negative determination (e.g., NO) in step S60. Then, the CPU 32 ends the processing of FIG. 2 without executing the processing of steps S30 to S45. Therefore, if the user does not desire to establish a WFD connection between the mobile terminal 10 and the current target MFP that is different from the last target MFP, this configuration may avoid establishment of the needless WFD connection.

In step S65, the CPU 32 displays a function screen for the current target MFP that is the same as the last target MFP, on the display 14, using the history information included in the history area 48. As described above, the function screen for the current target MFP is displayed prior to receipt of MFP information from the current target MFP. This configuration may therefore the function screen for the current target MFP to be displayed promptly or with least time.

In step S70, the CPU 32 determines whether a WFD connection has been established between the mobile terminal 10 and the target MFP. More specifically, for example, the CPU 32 determines whether the MAC address of the target MFP received in step S5 is stored in the predetermined area of the memory 34 (e.g., the area for storing the MAC address of the device with which the mobile terminal 10 currently establishes a WFD connection). When the CPU 32 determines that the MAC address of the target MFP received in step S5 is stored in the predetermined area of the memory 34, the CPU 32 determines that the WFD connection has been established between the mobile terminal 10 and the target MFP (e.g., YES in step S70) and the routine proceeds to step S80. When the CPU 32 determines that the MAC address of the target MFP received in step S5 is not stored in the predetermined area of the memory 34, the CPU 32 determines the WFD connection is not established between the mobile terminal 10 and the target MFP (e.g., NO in step S70) and the routine proceeds to step S75.

In step S75, similarly to step S35, the CPU 32 establishes a WFD connection between the mobile terminal 10 and the target MFP again. Therefore, the CPU 32 stores the MAC address of the target MFP in the predetermined area.

In step S80, similarly to step S40, the CPU 32 receives MFP information from the target MFP.

In step S85, the CPU 32 erases the history information from the history area 48 and stores new history information including the MFP information received in step S80 in the history area 48. In response to completion of step S85, the processing of FIG. 2 ends.

(Processing Implemented by Mobile Terminal 10 and MFP 100 or by Mobile Terminal 10 and MFP 200: FIGS. 3 to 8)

Referring to FIGS. 3 to 8, an explanation will be made on a specific example case implemented by the processing of FIG. 2 and operations performed by the mobile terminal 10 and the MFP 100 or by the mobile terminal 10 and the MFP 200 when one of the functions is selected on the function screen for the target MFP displayed in step S45 or S65 of FIG. 2. In FIGS. 3 to 8, thin arrows indicated between the mobile terminal 10 and either of the MFPs 100 and 200 represent NFC communication, and thick arrows indicated between the mobile terminal 10 and either of the MFPs 100 and 200 represent Wi-Fi® communication. Hereinafter, for easier understanding, the mobile terminal 10 is regarded as the doer of operations implemented by the CPU 32 of the mobile terminal 10.

Figure 3:
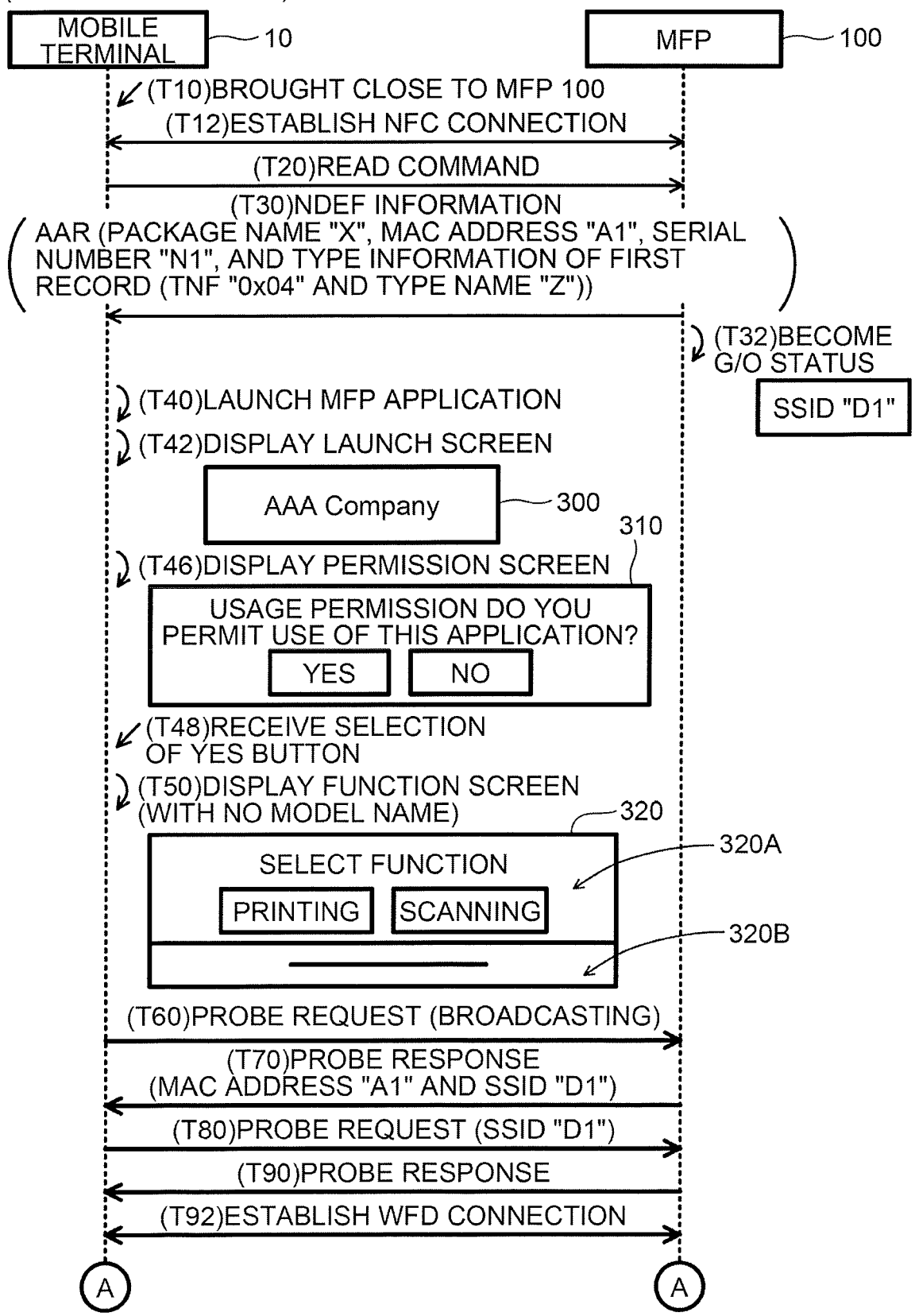
FIG. 3 is an operation sequence diagram for communication between the mobile terminal and a multifunction peripheral when an MFP application is launched for the first time in the illustrative embodiment according to one or more aspects of the disclosure.

(Processing Executed when MFP Application 40 is Launched for the First Time: FIGS. 2 and 3)

Referring to FIGS. 2 and 3, an explanation will be made on processing executed when the MFP application 40 is launched for the first time since the MFP application 40 was installed on the mobile terminal 10.

In step T10, the mobile terminal 10 is brought close to the MFP 100 by the user. In response to this, in step T12, an NFC connection is established between the mobile terminal 10 and the MFP 100 (e.g., the trigger event in the processing of FIG. 2).

In step T20, the mobile terminal 10 transmits a Read command for reading NDEF information from the MFP 100, via the NFC connection. In response to this, in step T30, the mobile terminal 10 receives NDEF information from the MFP 100 (e.g., step S5). The NDEF information includes AAR including the package name "X", the MAC address "A1", the serial number "N1", and the type information (e.g., the TNF "0x04" and the Type "Z") of the first record.

In step T32, the MFP 100 becomes a G/O status, and configures a WFDNW when establishing the NFC connection with the mobile terminal 10. The MFP 100 generates wireless setting information (e.g., an SSID and a password) to be used in a respective WFDNW every time the MFP 100 becomes a G/O status. In the example case of FIG. 3, the MFP 100 generates an SSID "D1".

In step T40, the mobile terminal 10 launches the MFP application 40 (e.g., step S8). In step T42, the mobile terminal 10 displays a launch screen 300. The launch screen 300 includes a text string "AAA Company" that indicates the vendor of the MFP 100.

When the MFP application 40 is launched for the first time, a flag indicating that permission for use of the MFP application 40 has been granted is not stored in the memory 34. Therefore, in step T46, the mobile terminal 10 displays a permission screen 310 (e.g., NO in step S15, and S20). The permission screen 310 includes a YES button that enables the user to allow permission for use of the MFP application 40, and a NO button that enables the user to disallow permission for use of the MFP application 40.

In step T48, the mobile terminal 10 receives input of a user selection of the YES button included in the permission screen 310 (e.g., YES in step S25). In response to this, in step T50, the mobile terminal 10 displays a default function screen 320. The default function screen 320 includes a function selecting field 320A including (e.g., displaying) text strings indicating the predetermined functions, e.g., the printing function and the scanning function. Nevertheless, at this moment, the mobile terminal 10 does not allow the user to perform any operation for selecting one of the functions. The default function screen 320 further includes a model name field 320B for displaying the model name of the MFP 100. Nevertheless, at this moment, the mobile terminal 10 has not received the model name of the MFP 100 yet. Therefore, the model name is not displayed in the model name field 320B.

In step T60, the mobile terminal 10 broadcasts a probe request. In response to this, in step T70, the mobile terminal 10 receives a probe response from the MFP 100 (e.g., step S35). The probe response includes the MAC address "A1" and the SSID "D1". The mobile terminal 10 identifies the probe response sent from the MFP 100 based on the MAC address "A1" received in step T30, and further identifies the SSID "D1" included in the probe response. In step T80, the mobile terminal 10 unicasts a probe request including the identified SSID "D1" to the MFP 100. In response to this, in step T90, the mobile terminal 10 receives a probe response from the MFP 100, and performs communication of various signals (e.g., Authentication signals, Association signals, WPS Exchange, and 4-way handshake) with the MFP 100 (e.g., step S35). Thus, in step T92, the mobile terminal 10 establishes a WFD connection with the MFP 100 (e.g., step S35).

Figure 4:
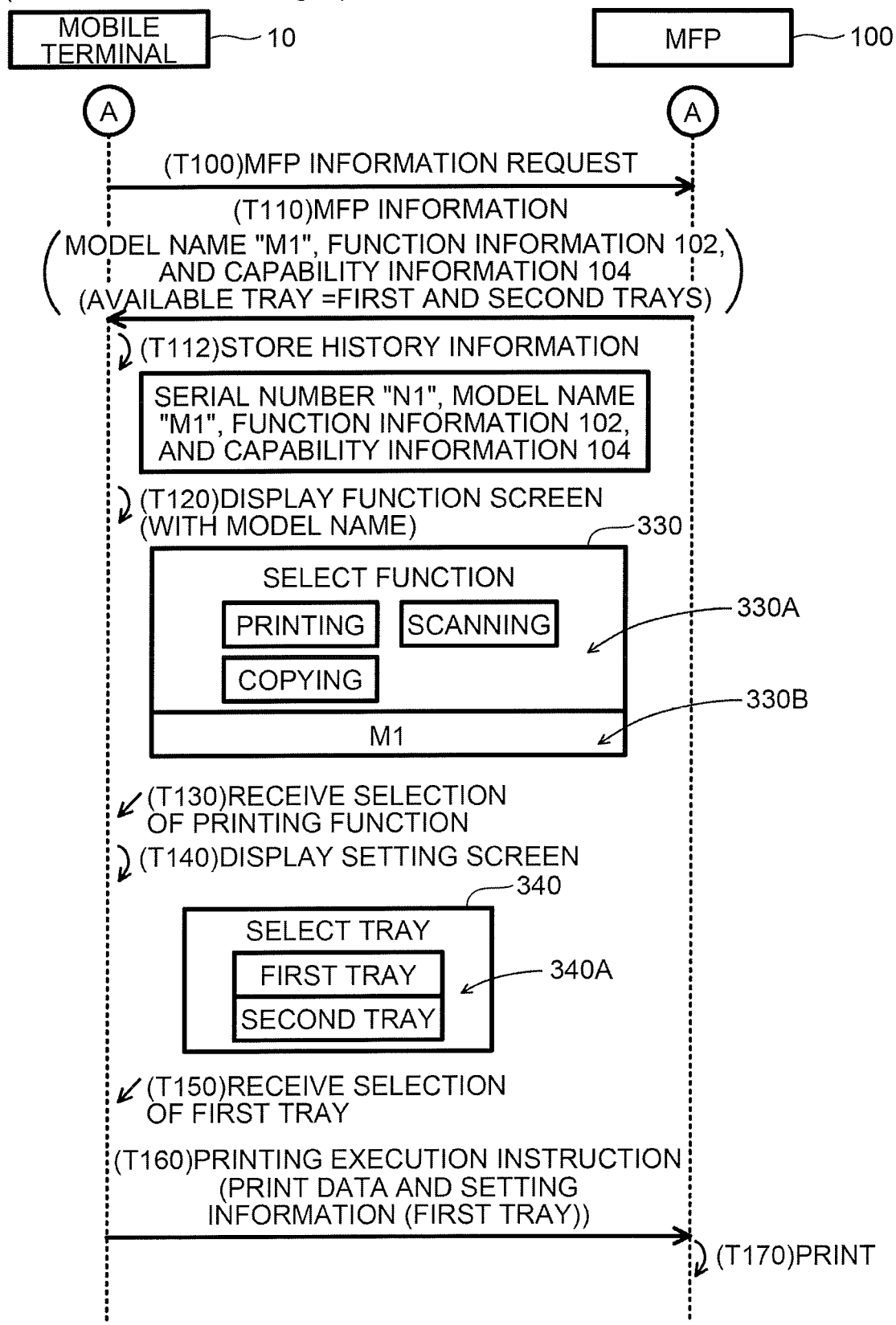
FIG. 4 is a continuation of the operation sequence diagram of FIG. 3 in the illustrative embodiment according to one or more aspects of the disclosure.

In step T100 of FIG. 4, the mobile terminal 10 transmits an MFP information request to the MFP 100 via the WFD connection established in step T92 of FIG. 3. In response to this, in step T110, the mobile terminal 10 receives MFP information from the MFP 100 (e.g., step S40). The MFP information includes the model name "M1", function information 102 (refer to FIG. 1), and capability information 104. The capability information 104 includes information indicating that a first tray and a second tray are both available for the MFP 100, as information for the printing function. In step T112, the CPU 32 stores history information into the history area 48 (e.g., step S43). The history information includes the serial number "N1" received in step T30 of FIG. 3 and the MFP information (e.g., the model "M1", the function information 102, and the capability information 104) received in step T110.

In step T120, the mobile terminal 10 displays a function screen 330 for the MFP 100 based on the function information 102 and the model name "M1" included in the history information (e.g., step S45). The function screen 330 includes a function selecting field 330A and a model name field 330B. The function selecting field 330A displays text strings indicating the functions identified by the function information 102 (e.g., the printing function, the scanning function, and the copying function). The model name field 330B displays the model name "M1" of the MFP 100.

In step T130, the mobile terminal 10 receives input of a user selection of a print button including the text string indicating the printing function, on the function screen 330. In response to this, the mobile terminal 10 identifies the capability information 104 for the printing function included in the history information stored in the history area 48. In step T140, the mobile terminal 10 displays a setting screen 340 based on the identified capability information 104. The setting screen 340 includes a setting field 340A for enabling the user to select one of the options, the first tray or the second tray.

In step T150, the mobile terminal 10 receives input of a user selection of an option of the first tray as the sheet tray to be used. The setting screen 340 is further configured to enable the user to select options for the other settings, e.g., printing resolution, printing color (e.g., color or monochrome), and duplex printing (e.g., on or off). The setting screen 340 is further configured to enable the user to select an image file representing an image to be printed. The user selects a desired image file as well as the desired options for the print settings in addition to the sheet tray.

In step T160, the mobile terminal 10 converts the image file to generate print data having a data format interpretable by the MFP 10. Subsequently, the mobile terminal 10 transmits, to the MFP 100, a printing execution instruction including the print data and the setting information indicating all the print settings specified by the user (e.g., the first tray specified in step T150). The printing execution instruction may be a command for causing the MFP 100 to execute the printing function.

In step T170, in response to receipt of the printing execution instruction from the mobile terminal 10, the MFP 100 executes the printing function using the print data in accordance with the setting information included in the printing execution instruction.

(Processing Executed when MFP Application 40 is Launched for the Second or Subsequent Times: FIGS. 5 to 8)

Figure 5:
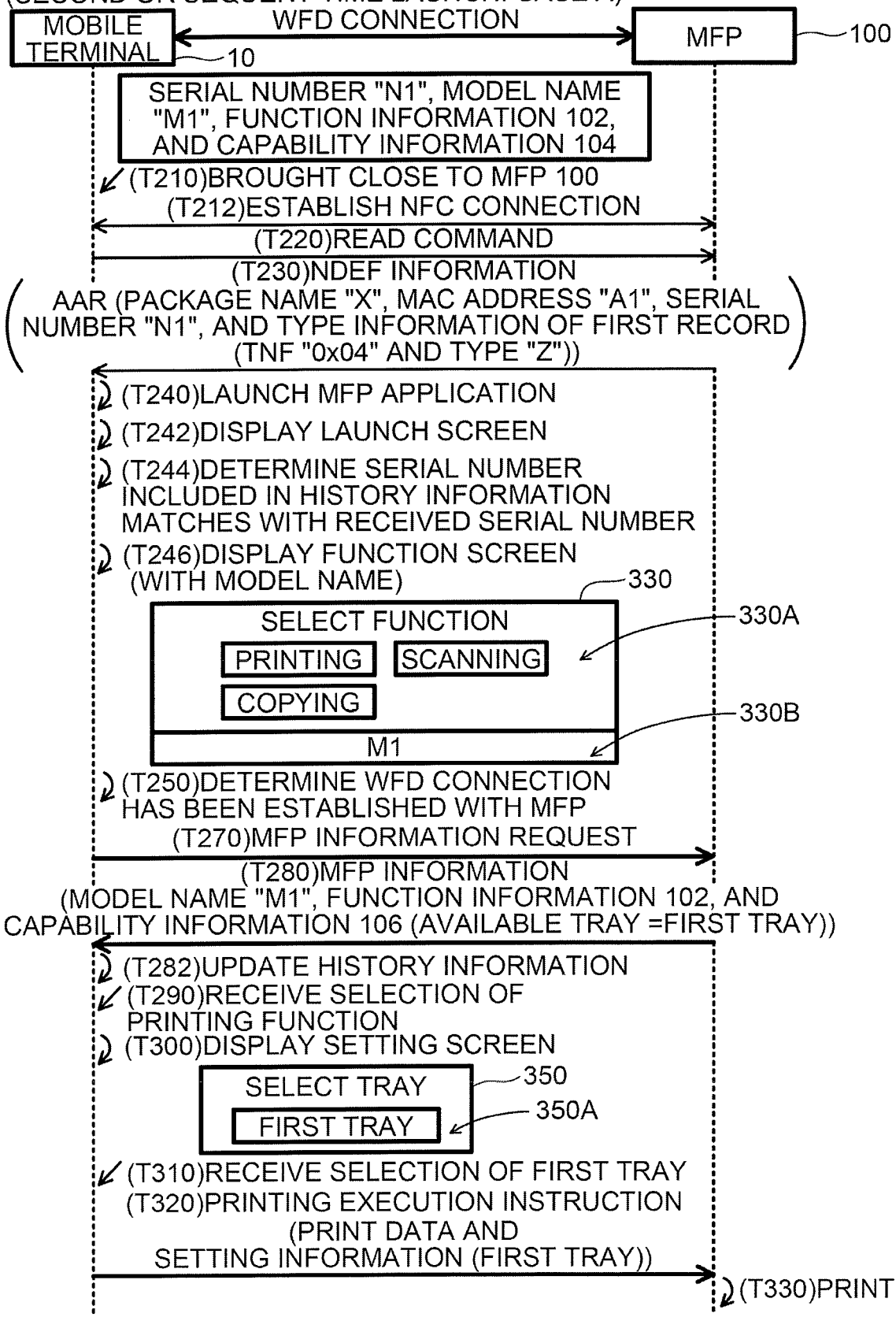
FIG. 5 is an operation sequence diagram for communication between the mobile terminal and the multifunction peripheral in Case A when the MFP application is launched for the second or subsequent time in the illustrative embodiment according to one or more aspects of the disclosure.

Referring to FIGS. 5 and 8, an explanation will be made on processing executed when the MFP application 40 is launched again after the processing of FIGS. 3 and 4. In this case, the mobile terminal 10 already stores the history information in the history area 48 (e.g., step T112 of FIG. 4).

(Case A: FIG. 5)

In Case A of FIG. 5, the WFD connection has been established since the WFD connection was established in step T92 of FIG. 3. Details of steps T210 to T242 are the same or similar to the details of steps T10 to T42 of FIG. 3. When the MFP application 40 was launched for the first time, in step T48 of FIG. 3, the mobile terminal 10 stored, in the memory 34, the permission flag indicating that permission for use of the MFP application 40 has been granted (e.g., YES in step S15 of FIG. 2). In Case A, therefore, the mobile terminal 10 does not display the permission screen. In step T244, the mobile terminal 10 determines that the history information is already stored in the history area 48 (e.g., YES in step S47) and also determines that the serial number "N1" included in the history information matches with the serial number received in step T230 (e.g., YES in step S50). In response to this, in step T246, the mobile terminal 10 displays the function screen 330 based on the model name "M1" and the function information 102 both included in the history information 48 (e.g., step S65) similarly to step T120 of FIG. 4.

In step T250, the mobile terminal 10 determines that the WFD connection has been established with the MFP 100 (e.g., YES in step S70) and thus the mobile terminal 10 does not execute the processing for reestablishing a WFD connection with the MFP 100 (e.g., step S75). Through steps T270 and T280, the mobile terminal 10 receives MFP information from the MFP 100 via the WFD connection. At this moment of FIG. 4, both of the first tray and the second tray are available in the MFP 100. Nevertheless, at the same moment of FIG. 5, only the first tray is available due to, for example, removal of the second tray from the MFP 100. Therefore, the MFP information received in step T280 includes capability information 106 indicating that only the first tray is available. In step T282, the mobile terminal 10 erases the history information from the history area 48 and stores new history information including the received MFP information in the history area 48 (e.g., step S85).

Details of step T290 is the same or similar to the details of step T130 of FIG. 4. In step T300, the mobile terminal 10 displays a setting screen 350 based on the capability information 106 included in the history information. Therefore, the setting screen 350 shows different contents from the setting screen 340. More specifically, for example, a setting field 350A of the setting screen 350 is configured to enable the user to select the option of the first tray only. As described above, in response to the change of the capability information of the MFP 100, the mobile terminal 10 may display the different setting screen 350 based on the changed capability information. Consequently, the user may select an appropriate option in the print settings. Details of steps T310 to T330 are the same or similar to the details of steps T150 to T170 of FIG. 4.

Figure 6:
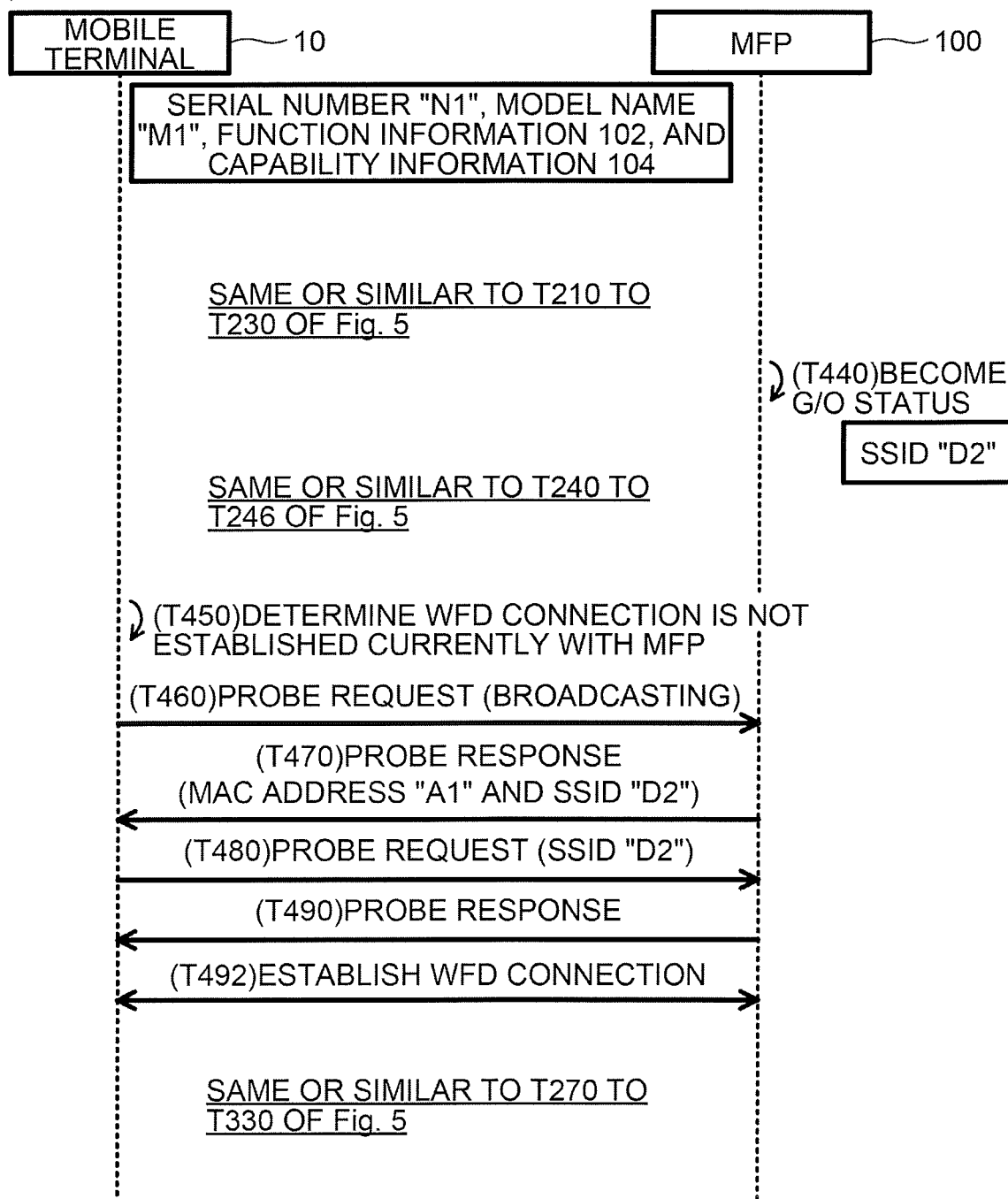
FIG. 6 is an operation sequence diagram for communication between the mobile terminal and the multifunction peripheral in Case B when the MFP application is launched for the second or subsequent time in the illustrative embodiment according to one or more aspects of the disclosure.

(Case B: FIG. 6)

In Case B of FIG. 6, the WFD connection established in step T92 of FIG. 3 has been broken and the MFP 100 is not in the G/O status. Details of steps T210 to T230 of FIG. 6 are the same or similar to the details of steps T210 to T230 of FIG. 5. In step T440, the MFP 100 becomes the G/O status again and configures another WFDNW identified by a new SSID "D2". Details of steps T240 to T246 of FIG. 6 are the same or similar to the details of steps T240 to T246 of FIG. 5.

In step T450, the mobile terminal 10 determines that a WFD connection is not currently established with the MFP 100 (e.g., NO in step S70). In response to this, through steps T460 to T492, the mobile terminal 10 reestablishes a WFD connection with the MFP 100 (e.g., step S75). Details of steps T460 to T492 are the same or similar to the details of steps T60 to T92 of FIG. 3 except that a probe response transmitted in step T470 and a probe request transmitted in step T480 each include the SSID "D2", which is different from the SSID "D1". Details of steps T270 to T330 of FIG. 6 are the same or similar to the details of steps T270 to T330 of FIG. 5.

Figure 7:
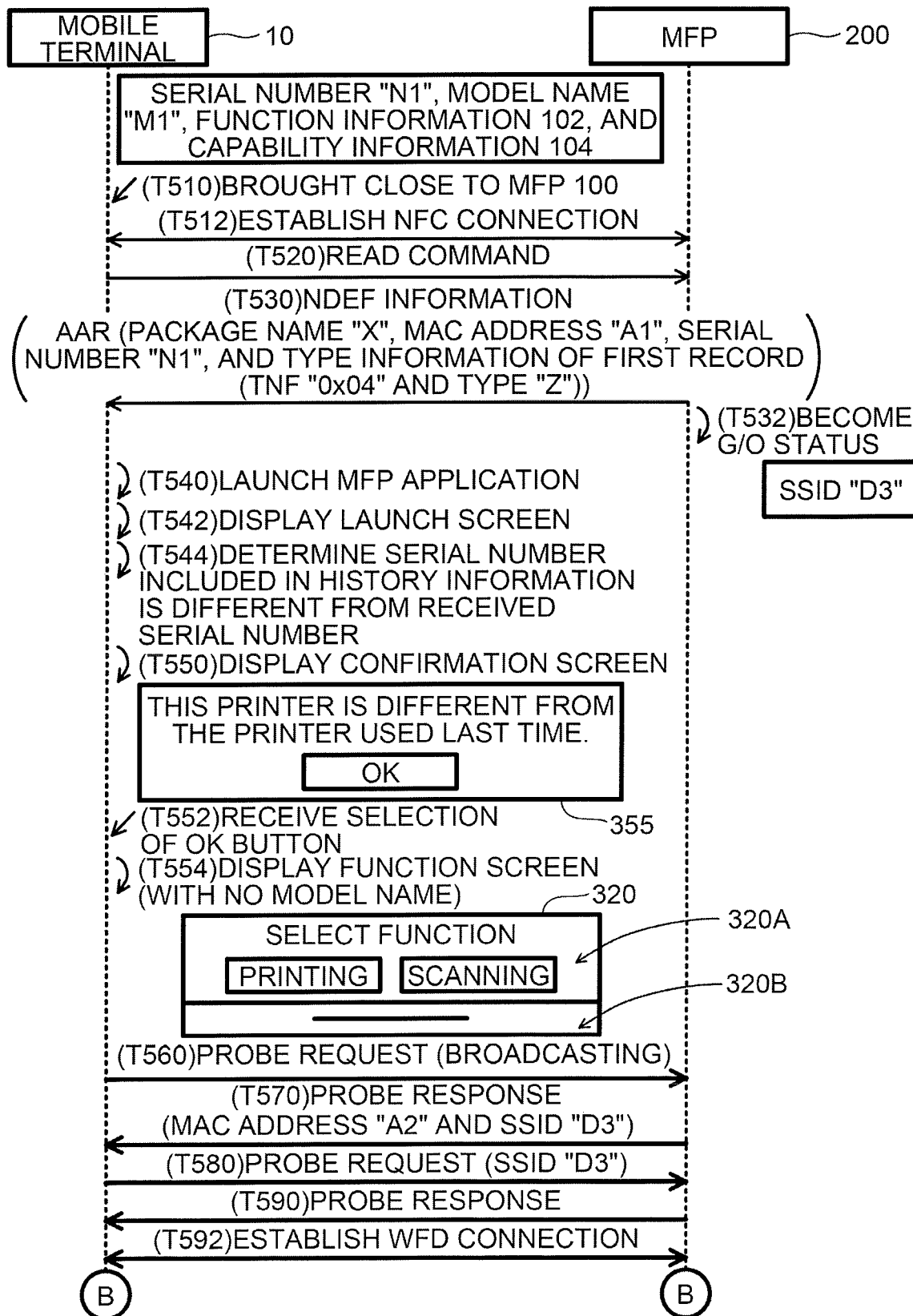
FIG. 7 is an operation sequence diagram for communication between the mobile terminal and another multifunction peripheral in Case C when the MFP application is launched for the second or subsequent time in the illustrative embodiment according to one or more aspects of the disclosure.

(Case C: FIGS. 7 and 8)

In Case C of FIGS. 7 and 8, the mobile terminal 10 establishes an NFC connection with the MFP 200, which is different from the MFP 100. Details of steps T510 to T520 are the same or similar to the details of steps T10 to T20 of FIG. 3 except that the target device is the MFP 200 instead of the MFP 100. In step T530, the mobile terminal 10 receives NDEF information from the MFP 200. The NDEF information includes an AAR, a MAC address "A2" of the MFP 200, a serial number "N2" of the MFP 200, and type information of the first record (e.g., the TNF "0x04" and the Type "Z"). In step T532, the MFP 200 becomes the G/O status and configures another WFDNW identified by an SSID "D3".

Details of steps T540 and T542 are the same or similar to the details of steps T240 and T244 of FIG. 5. In step T544, the mobile terminal 10 determines that the serial number included in the history information (e.g., the serial number "N1") does not match with the serial number received in step T530 (e.g., the serial number "N2") (e.g., NO in step S50 of FIG. 2). In response to this, in step T550, the mobile terminal 10 displays a confirmation screen 355 for asking the user whether a WFD connection needs to be established with the MFP 200 (e.g., step S55). In step T552, the mobile terminal 10 receives input of a user selection of an OK button included in the confirmation screen 355 (e.g., YES in step S60). In response to this, in step T554, the mobile terminal 10 displays the default function screen 320 similar to step T50 of FIG. 2 (e.g., step S30).

Details of steps T560 to T592 are the same or similar to the details of steps T60 to T92 of FIG. 3 except that a probe response transmitted in step T570 includes the MAC address "A2" and the SSID "D3" and a probe request transmitted in step T580 includes the SSID "D3". Thus, the mobile terminal 10 establishes a WFD connection with the MFP 200 (e.g., step S35).

Through steps T600 and T610 of FIG. 8, the mobile terminal 10 receives MFP information from the MFP 200 via the WFD connection established in step T592 of FIG. 7 (e.g., step S40). The MFP information includes the model name "M2" of the MFP 200, the function information 202 (refer to FIG. 1), and capability information 204. In step T612, the mobile terminal 10 erases the history information from the history area 48 and stores new history information including the received MFP information in the history area 48.

In step T620, the mobile terminal 10 displays a function screen 360 for the MFP 200 based on the function information 202 and the model name "M2" included in the history information (e.g., step S45). The function screen 360 includes a function selecting field 360A and a model name field 360B. The function selecting field 360A includes or displays text strings indicating the functions identified by the function information 202 (e.g., the printing function, the scanning function, the copying function, and the facsimile function). The model name field 360B includes or displays the model name "M2" of the MFP 200. Details of steps T630 to T670 are the same or similar to the details of steps S130 to S170 of FIG. 4 except that the target device is the MFP 200.

(Effects of Illustrative Embodiment)

In the illustrative embodiment, the user brings the mobile terminal 10 close to the MFP 100 (e.g., step T10 of FIG. 3) to establish an NFC connection between the mobile terminal 10 and the MFP 100 (e.g., step T12). In this case, when the MFP application 40 is launched by the OS program 38 in response to receipt of NDEF information from the MFP 100 via the NFC connection (e.g., step T30), the MFP application 40 receives the NDEF information from the OS program 38. The NDEF information includes the MAC address "A1". Therefore, the mobile terminal 10 may establish a WFD connection with the MFP 100 using the MAC address "A1" in accordance with the MFP application 40 without requiring any operation event performed by the user for selecting the SSID "D1" included in the probe response received in step T70 of FIG. 3, i.e., without requiring a device selecting operation performed by the user for selecting the MFP 100 (e.g., steps T60 to T92). Subsequently, the mobile terminal 10 receives the MFP information including the function information 102 from the MFP 100 via the WFD connection in accordance with the MFP application 40 (e.g., step T110 of FIG. 4) and displays the function screen 330 based on the received function information 102 (e.g., step T140). That is, close approach of the mobile terminal 10 to the MFP 100 may cause the function screen 330 to appear. Therefore, the user may confirm the function screen 330 without performing any input operation for selecting an appropriate device. This configuration may therefore increase user friendliness.

Further, in response to establishment of an NFC connection between the mobile terminal 10 and the MFP 100 (e.g., step T12) by close approach of the mobile terminal 10 to the MFP 100 (e.g., step T10), the MFP application 40 may be launched without requiring any input operation event (e.g., step T40). This configuration may therefore eliminate the need for any user operation for launching the MFP application 40, which may result in further increasing user friendliness.

Once the MFP application 40 is launched, the mobile terminal 10 broadcasts a probe request without requiring any input operation event for searching one or more master stations surrounding the mobile terminal 10 (e.g., step T60). Thus, this configuration may eliminate the need for any user operation for searching one or more master stations, which may result in further increasing user friendliness.

In particular, as described in Case B of FIG. 6, the mobile terminal 10 may establish a WFD connection with the MFP 100 automatically in accordance with the MFP application 40 without requiring any input operation event performed by the user (e.g., the launching operation, the device selecting operation, the searching operation, the operation performed in step T48 of FIG. 3, and the operation performed in step T552 of FIG. 7) on the operation interface 12 and the display 14 functioning as the touch screen (e.g., step T492). That is, close approach of the mobile terminal 10 to the MFP 100 only may cause the function screen 330 to appear. Therefore, the user may confirm the function screen 330 without performing any input operation onto the operation interface 12 and the display 14. This configuration may therefore further increase user friendliness.

(Correspondences)

The mobile terminal 10 is an example of a "terminal". The MFP 100 is an example of a "first function-executing device". In each of Case A of FIG. 5 and Case B of FIG. 6, the MFP 100 is an example of a "second function-executing device". In Case C of FIGS. 7A and 8, the MFP 200 is an example of the "second function-executing device". The MFP application 40 is an example of a "computer program". The package name "X" is an example of "program identifying information". The NFC I/F 18 is an example of a "first wireless interface". The Wi-Fi® I/F 16 is an example of a "second wireless interface". The NFC connection in step T12 of FIG. 3 is an example of a "first wireless connection". The WFD connection in step T92 of FIG. 3 is an example of a "second wireless connection". The NFC connection in step T212 of Case B of FIG. 6 is another example of the "first wireless connection". The WFD connection in step T492 of Case B of FIG. 6 is another example of the "second wireless connection". Each of the NFC connection in step T212 of FIG. 5, the NFC connection in step T212 of FIG. 6, and the NFC connection in step T512 of FIG. 7 is an example of a "third wireless connection". The WFD connection in step T592 of FIG. 7 is an example of a "fourth wireless connection". The WFD connection established in the initial status of FIG. 5 is an example of a "fifth wireless connection". The WFD connection established in step T492 of FIG. 6 is an example of a "sixth wireless connection".

The NDEF information transmitted in step T30 of FIG. 3 is an example of "first identifying information. Each of the NDEF information transmitted in step T230 of FIG. 5 and the NDEF information transmitted in step T530 of FIG. 7 is an example of "second identifying information. The MAC address "A1" transmitted in step T30 of FIG. 3 is an example of a "first device-identifying information. The serial number "N1" transmitted in step T30 of FIG. 3 is an example of a "second device-identifying information. Each of the serial number "N1" transmitted in step T230 of FIG. 5 and the serial number "N2" transmitted in step T530 of FIG. 7 is an example of a "third device-identifying information. The MAC address "A2" transmitted in step T530 of FIG. 7 is an example of a "fourth device-identifying information. The function information 102 transmitted in step T110 of FIG. 4 is an example of "first function information". The function information 202 transmitted in step T610 of FIG. 8 is an example of "second function information". The function screen 330 is an example of a "first function screen". The function screen 360 is an example of a "second function screen". The setting screen 340 is an example of a "first setting screen". The setting screen 350 is an example of a "second setting screen". The printing function is an example of a "first function". The capability information 104 transmitted in step T110 of FIG. 4 is an example of "first capability information". The capability information 106 transmitted in step T280 of FIG. 5 is an example of "second capability information". The printing execution instruction transmitted in step T160 of FIG. 4 is an example of a "first function-execution instruction". The printing execution instruction transmitted in step T320 of FIG. 5 is an example of a "second function-execution instruction".

While the disclosure has been described in detail with reference to the specific embodiment thereof, this is merely an example, and various changes, arrangements and modifications may be applied therein without departing from the spirit and scope of the disclosure. Various variations of the illustrative embodiment will be described below.

(First Variation)

Each of the mobile terminal 10 and the MFPs 100 and 200 may include, instead of the NFC I/F 18, an I/F for enabling each device to perform wireless communication in compliance with another communication system that may be different from the NFC system (e.g., an infrared communication system, a TransferJet™ (TransferJet™ is a trademark owned by Sony Corporation of Tokyo, Japan) system, or a Bluetooth® (Bluetooth® is a registered trademark owned by BLUETOOTH SIG. INC. of Kirkland, Wash.) system. In this case, each of the mobile terminal 10 and the MFPs 100 and 200 may communicate information corresponding to the NDEF information with each other using wireless connection via such an I/F. That is, the "first communication interface" is not limited to the NFC I/F 18, and may be an I/F for enabling short-distance wireless communication in compliance with another communication system.

(Second Variation)

In one example, prior to establishment of an NFC connection with the mobile terminal 10 (e.g., prior to step T10 of FIG. 3), the MFP 100 may generate and store an SSID for identifying a wireless network to be configured by the MFP 100 (hereinafter, referred to as the "target SSID"). In this case, in step S5 of FIG. 2, the mobile terminal 10 may receive NDEF information including the target SSID instead of the MAC address of the target MFP. In step S35, the mobile terminal 10 may identify the probe response including the target SSID from one or more probe responses received in response to broadcast of a prove request, and may unicast a probe request including the target SSID. In the second variation, also, the mobile terminal 10 may establish a wireless connection with the target MFP without requiring the device selecting operation performed by the user. In the second variation, the target SSID is an example of each of the "first device identifying information" and the "fourth device identifying information".

(Third Variation)

In step S43 of FIG. 2, the mobile terminal 10 may store history information including the MAC address of the target MFP instead of the serial number. In this case, in step S50, the mobile terminal 10 may determine whether the MAC address included in the history information matches with the MAC address received in step S5. In the third variation, the MAC address is an example of each of the "second device identifying information" and the "third device identifying information".

(Fourth Variation)

In the illustrative embodiment and the first to third variations, the MFP 100 operates as a master station, i.e., a group owner (G/O). Alternatively, in one example, in step S35 of FIG. 2, the mobile terminal 10 may operate as the G/O and establish a WFD connection with the target MFP by transmitting an Invitation request including the MAC address of the target MFP to the target MFP. That is, each of the "second wireless connection" and the "fourth wireless connection" may be a wireless connection in which the terminal operates as a slave station, or may be a wireless connection in which the terminal operates as a master station. In another example, the mobile terminal 10 might not necessarily support a WFD system. In this case, the mobile terminal 10 may establish a wireless connection with the MFP 100, in compliance with a legacy system. In still another example, the mobile terminal 10 might not necessarily establish a wireless connection in compliance with a WiFi® system (e.g., the WFD system or a legacy Wi-Fi® system). Alternatively, the mobile terminal 10 may establish a wireless connection with the MFP 100 in accordance with a Bluetooth® system (Bluetooth® is a registered trademark owned by BLUETOOTH SIG. INC. of Kirkland, Wash.). That is, the "second wireless connection" and the "fourth wireless connection" are not limited to the WFD connection.

(Fifth Variation)

The OS program 38 may be configured to, even if NDEF information not including the package name "X" is received, launch the MFP application 40. That is, the "first identifying information" might not necessarily include the program identifying information.

(Sixth Variation)

The processing of each of steps S15 to S25 of FIG. 2 might not necessary be executed.

(Seventh Variation)

The MFP information transmitted in each of step T110 of FIG. 4, step T280 of FIG. 5, and step T610 of FIG. 8 might not necessarily include the capability information. In this case, the setting screen displayed in step T140 of FIG. 4 might not necessary be displayed.

(Eighth Variation)

The processing of each of steps S43 and S47 to S85 of FIG. 2 may be omitted. In this case, when a positive determination (e.g. YES) is made in step S15, the routine may proceed to step S30.

(Ninth Variation)

The each of the "first function-executing device" and the second function-executing device" might not necessarily be a device capable of executing the printing function and the scanning function, and may be another device, e.g., a general-purpose computer or a server.

(Tenth Variation)

In the illustrative embodiment and variations, the processing in all steps illustrated in FIGS. 2 to 8 is implemented by software (e.g., the program). Nevertheless, in this variation, for example, the processing in at least one of the steps depicted in FIGS. 2 to 8 may be implemented by hardware, for example, a logical circuit.

The technical elements described in the specification and the drawings exhibit technical usability alone or in various combinations, and are not limited to those in the claims at the time of the application of the disclosure. Further, the techniques described as examples in the specification or drawings may achieve a plurality of objects simultaneously, and has technical utility by achieving any one of these objects.

What is claimed is:

1. A non-transitory computer-readable storage medium storing a computer program for causing a computer of a terminal to perform:

receiving first device-identifying information from an operating system ("OS") program of the terminal, wherein the first device-identifying information identifies a first function-executing device and is included in first identifying information received at the terminal, the first identifying information being received at the terminal from the first function executing device via a first wireless connection established between the terminal and the first function executing device via a first wireless interface of the terminal;

receiving first function information that indicates at least one function executable by the first function-executing device, from the first function-executing device via a second wireless connection between a second wireless interface of the terminal and the first function-executing device, wherein the second wireless connection is established using the first device-identifying information and without requiring user input of an operation to select a connection-target function-executing device as the first function-executing device from a group of function-executing devices displayed on a display of the terminal and found by searching one or more multifunction devices with which the terminal is capable of communicating, and wherein a maximum communicable speed of wireless communication via the second wireless interface is faster than a maximum communicable speed of wireless communication via the first wireless interface; and displaying, on the display of the terminal, a screen indicating the function executable by the first function-executing device after receiving the first function information.

2. The non-transitory computer readable storage medium according to claim 1, wherein the computer program being launched by the OS occurs in response to receipt of the first identifying information at the terminal.

3. The non-transitory computer readable storage medium according to claim 2, wherein in a case where the computer program is launched for the first time, the computer program further causes the terminal to perform:

displaying, on the display, a permission screen for enabling a user of the terminal to grant usage permission; and requiring the user input of the operation to select a connection-target function-executing device from at least one function-executing device as the first function-executing device.

4. The non-transitory computer readable storage medium according to claim 1, wherein the computer program is executed even in a case where other device-identifying information, which identifies a function-executing device other than the first function-executing device, is stored in a memory of the terminal.

5. The non-transitory computer readable storage medium according to claim 1, wherein the screen indicating the function executable by the first function-executing device includes a model name of the first function-executing device.

6. The non-transitory computer readable storage medium according to claim 1, wherein the first function information is received with information indicating printing color availability of the first function-executing device.

7. The non-transitory computer readable storage medium according to claim 1, wherein the first device-identifying information is a MAC address.

8. The non-transitory computer readable storage medium according to claim 1, wherein the function includes at least one of a printing function and a scanning function.

9. The non-transitory computer readable storage medium according to claim 1, wherein the first wireless interface is a Near Field Communication ("NFC") compliant.

10. The non-transitory computer readable storage medium according to claim 1, wherein the second wireless interface is a Wi-Fi compliant.

11. A terminal comprising:

a first wireless interface;

a second wireless interface that is different from the first wireless interface, wherein a maximum communicable speed of wireless communication via the second wireless interface is faster than a maximum communicable speed of wireless communication via the first wireless interface;

a display;

a memory; and a controller configured to execute instructions from the memory that, when executed, cause the terminal to perform:

receiving first device-identifying information, wherein the first device-identifying information identifies a first function-executing device and is included in first identifying information received at the terminal, the first identifying information being received at the terminal from the first function executing device via a first wireless connection established between the terminal and the first function executing device via the first wireless interface;

in response to receipt of the first device-identifying information, establishing a second wireless connection via the second wireless interface using the first device-identifying information without requiring user input of an operation to select a connection-target function-executing device as the first function-executing device from a group of function-executing devices displayed on a display of the terminal and found by searching one or more multifunction devices with which the terminal is capable of communicating;

receiving first function information that indicates at least one function executable by the first function-executing device, from the first function-executing device via the second wireless connection between the second wireless interface of the terminal and the first function-executing device, wherein the second wireless connection is established using the first device-identifying information; and displaying, on the display of the terminal, a screen indicating the function executable by the first function-executing device after receiving the first function information.

12. The terminal according to claim 11, wherein the instructions are executed in response to receipt of the first identifying information at the terminal.

13. The terminal according to claim 12, wherein in a case where the instructions are executed for the first time, the controller further executes instructions from the memory to cause the terminal to perform:

displaying, on the display, a permission screen for enabling a user of the terminal to grant usage permission; and requiring the user input of the operation to select a connection-target function-executing device from at least one function-executing device as the first function-executing device.

14. The terminal according to claim 11, wherein the instructions are executed even in a case where other device-identifying information, which identifies a function-executing device other than the first function-executing device, is stored in the memory of the terminal.

15. The terminal according to claim 11, wherein the screen indicating the function executable by the first function-executing device includes a model name of the first function-executing device.

16. The terminal according to claim 11, wherein the first function information is received with information indicating printing color availability of the first function-executing device.

17. The terminal according to claim 11, wherein the first device-identifying information is a MAC address.

18. The terminal according to claim 11, wherein the function includes at least one of a printing function and a scanning function.

19. A method comprising:

receiving first device-identifying information, wherein the first device-identifying information identifies a first function-executing device and is included in first identifying information received at a terminal, the first identifying information being received at the terminal from the first function executing device via a first wireless connection established between the terminal and the first function executing device via a first wireless interface of the terminal;

in response to receipt of the first device-identifying information, establishing a second wireless connection via a second wireless interface of the terminal using the first device-identifying information without requiring user input of an operation to select a connection-target function-executing device as the first function-executing device from a group of function-executing devices displayed on a display of the terminal and found by searching one or more multifunction devices with which the terminal is capable of communicating;

receiving first function information that indicates at least one function executable by the first function-executing device, from the first function-executing device via the second wireless connection between the second wireless interface of the terminal and the first function-executing device, wherein the second wireless connection is established using the first device-identifying information; and displaying, on the display of the terminal, a screen indicating the function executable by the first function-executing device after receiving the first function information, wherein a maximum communicable speed of wireless communication via the second wireless interface is shorter than a maximum communicable speed of wireless communication via the first wireless interface.

* * * * *

UNITED STATES PATENT AND TRADEMARK OFFICE
CERTIFICATE OF CORRECTION

| | |
|---|---|
| PATENT NO. | : 11,503,669 B2 |
| APPLICATION NO. | : 17/106723 |
| DATED | : November 15, 2022 |
| INVENTOR(S) | : Hirotaka Asakura and Longlong Ruan |

It is certified that error appears in the above-identified patent and that said Letters Patent is hereby corrected as shown below:

In the Claims

Claim 11, Column 21, Line 26: Delete "a display" and insert -- the display -- therefor.

Claim 19, Column 22, Line 53: Delete "shorter" and insert -- faster -- therefor.

Signed and Sealed this
Eighth Day of August, 2023

Katherine Kelly Vidal
*Director of the United States Patent and Trademark Office*